United States Patent [19]

Harris

[11] E Re. 30,364

[45] Reissued Aug. 12, 1980

[54] VARIABLE SPEED TRANSMISSION

[75] Inventor: Trevor L. Harris, Costa Mesa, Calif.

[73] Assignee: Harris Dynamics, Costa Mesa, Calif.

[21] Appl. No.: 904,004

[22] Filed: May 8, 1978

Related U.S. Patent Documents

Reissue of:

[64] Patent No.: 3,892,139
Issued: Jul. 1, 1975
Appl. No.: 468,412
Filed: May 9, 1974

[51] Int. Cl.[2] ..... F16H 29/04

[52] U.S. Cl. ..... 74/116; 74/117; 74/138

[58] Field of Search ..... 74/116, 117, 138

[56] References Cited

U.S. PATENT DOCUMENTS

| | | | |
|---|---|---|---|
| 1,929,058 | 10/1933 | Enard | 74/116 |
| 3,003,358 | 10/1961 | Leonard | 74/116 |
| 3,005,355 | 10/1961 | Mason | 74/116 X |
| 3,213,697 | 10/1965 | Hartmann et al. | 74/117 |

FOREIGN PATENT DOCUMENTS

| | | | |
|---|---|---|---|
| 822931 | 11/1951 | Fed. Rep. of Germany | 74/116 |
| 981625 | 5/1951 | France | 74/116 |
| 1028996 | 5/1953 | France | 74/116 |
| 1067935 | 6/1954 | France | 74/116 |

*Primary Examiner*—Edward G. Favors
*Attorney, Agent, or Firm*—Gordon L. Peterson

[57] ABSTRACT

A variable speed transmission comprising outer and inner rotatable members mounted for rotation about first and second rotational axes, respectively, at least first and second one-way clutches mounted on the inner rotatable member, and first and second drive elements attached to the first and second clutches, respectively, and to the outer member so that rotation of one of the rotatable members about its rotational axis causes the drive elements to rotate the other of the rotatable members about its rotational axis. The radial spacing between the rotational axes can be adjusted to vary the drive ratio.

24 Claims, 8 Drawing Figures

VARIABLE SPEED TRANSMISSION

Matter enclosed in heavy brackets [ ] appears in the original patent but forms no part of this reissue specification; matter printed in italics indicates the additions made by reissue.

BACKGROUND OF THE INVENTION

Variable speed transmissions are used to transmit power at selectively variable ratios. One class of variable speed transmission includes an inner rotatable member and an outer rotatable member drivingly coupled by a drive element. Rotation of one of the rotatable members drives the other rotatable member through the drive element.

Some prior art variable speed transmissions of this type are very complex as evidenced by Herman U.S. Pat. No. 1,807,035. Others use a complex arrangement of planatary gears as evidenced by Green U.S. Pat. No. 741,904 and Hayden U.S. Pat. No. 977,449.

In the variable speed transmission disclosed in Mitchell U.S. Pat. No. 736,129, ratio change is obtained by displacing the inner rotatable member linearly relative to the outer rotatable member. This changes the radial spacing between the axes of rotation of the inner and outer rotatable members to in turn change the ratio. Although radially displacing the axes of rotation is a desirable way to obtain ratio change, relative linear movement of the rotatable members is not desirable for all applications.

The variable speed transmission of the Mitchell patent used one-way clutches around the periphery of the outer rotatable member to form a driving connection between the drive element and the outer rotatable member. The use of the one-way clutches at the periphery of the outer member is fraught with disadvantages. For example, under high speed operation, centrifugal force would act on the one-way clutches and push them against the outer rotatable member to create relatively high friction. This type of one-way clutch tends to collect grit which in turn causes friction and high wear.

One way clutches of the type shown in the Mitchell patent require very hard, inflexible surfaces for proper operation. In this prior art construction, the one-way clutches operate in a groove formed at the periphery of the outer rotatable member. A primary problem with this construction is that the walls of the groove must be very rigid and accurately formed in order for the one-way clutches to operate satisfactorily.

SUMMARY OF THE INVENTION

The present invention eliminates the problems noted above resulting from locating the one-way clutches at the periphery of the outer rotatable member. With this invention, the one-way clutches are mounted on the inner rotatable member and are concentric therewith. This eliminates the need for the annular groove in the outer rotatable member and the accompanying necessity for hard surfaces on this groove. Furthermore, locating the one-way clutches on the inner rotatable member increases the torque capacity of the transmission and reduces friction. In addition, the type of one-way clutch suitable for mounting on the inner rotatable member tends to be self-cleaning, and the problems noted above caused by centrifugal force are minimized.

The drive element between the inner and outer rotatable members may take different forms. For example, the drive element may include a rigid link. The rigid link has the advantage of permitting high speed operation and it can be used to drive either the inner or outer rotatable member. In addition, it minimizes the number of parts required.

The present invention teaches that, when the inner member is the drive member, the drive ratio of a variable speed transmission of this type is approximately $1:1/1-X$ where X equals A/R and A is the displacement of the axis of rotation of the inner member from the axis of rotation of the outer member and R is the distance between the axis of rotation of the inner member and the center of the location of attachment of the drive element to the inner member. This formula can be used when A is less than R. Accordingly, to maximize the drive ratio and to obtain the greatest ratio change for an increment of relative displacement between the rotational axes of the rotatable members, the R dimension should be minimized. To accomplish this, the drive element may take the form of a rigid link circumscribing an eccentric which in turn is mounted on the one-way clutch. A bearing is provided between the eccentric and the rigid link to allow relative movement therebetween. This construction minimizes the R dimension to thereby achieve the advantages noted above.

The present invention also teaches that the drive element may take the form of a flexible element. The flexible element may be a cable affixed to the outer and inner rotatable members or a chain drivingly coupled to a sprocket mounted on the one-way clutch. In either event, tension should be maintained on the flexible drive element by a spring or other suitable means. Because a flexible drive element requires less space than a rigid link, it is possible to displace the rotational axes of the rotational members' greater amounts than with a rigid link to thereby achieve substantial drive ratio changes. In addition, the surface of the one-way clutch contacted by the flexible drive element can be contoured to tailor the drive ratio to the angular position of the inner rotatable member about its rotational axis.

To obtain a ratio change either or both of the inner and outer rotatable members may be moved relative to a fixed supporting structure such as a housing. An optional feature of the present invention is mounting one of the rotatable members for pivotal movement about a third axis radially displaced from the first and second rotational axes. By moving the rotatable members so mounted along a path about a third axis, the relative locations of the first and second rotational axes is changed to provide a ratio change. For some installations, this pivotal motion to obtain ratio change is simpler and otherwise superior to moving of the rotatable members linearly to obtain ratio change.

After the relative position of the first and second rotational axes has been selected, it is necessary to maintain this relationship during operation of the transmission. With the present invention, this is advantageously accomplished by releasable detent means. Such detent means includes cam means responsive to the operator of the transmission tending to move the rotatable members to change the relative positions of the rotational axes for camming the detent to a releasing position to allow such ratio change to occur.

The inner and outer rotatable members may be coupled by one or more drive elements. If only one drive element is utilized, the output of the transmission will inherently be nonlinear unless other means are employed to obtain a linear output. To approach a linear output, the number of drive elements and associated one-way clutches can be increased. The one-way clutches can advantageously be arranged in an axially extending row along the inner rotatable member.

With the present invention, either the inner or outer rotatable members may be used as the drive or driven member provided that the one-way clutches are appropriately set. However, the drive ratio for a given positioning of the first and second rotational axes will not be the same when the inner member is the driven member as when it is the drive member. For example, a drive ratio of 1 to 10 may be obtained when the inner member is the drive member and a ratio of 1 to 1.9 may be obtained for the same relative positions of the first and second rotational axes when the inner rotatable member is the driven member.

In use, each of the one way clutches is in a driving mode during a portion of the cycle and this tends to provide output pulses for driving the driven member. Another distinction between the present invention and the device of the Mitchell patent is that with this invention the number of such output pulses is a function of the angular velocity of the outer rotatable member whereas with the Mitchell device the number of output pulses is a function of the angular velocity of the inner member. Thus, a greater number of output pulses for a given ratio and number of drive elements, and hence a more even output, is obtained with the present invention when the inner rotatable member is used as the driving member. For some applications the use of the inner rotatable member as the driving member is the only practical arrangement.

Another feature of this invention is that two or more of the transmission units, each of which includes inner and outer rotatable members, can be interconnected to form the transmission. Because different drive ratios are obtained depending upon whether the inner rotatable member is driving or being driven, the overall maximum ratio of the transmission can be varied by the manner in which the transmission units are interconnected. For example, for a maximum ratio change, the transmission unit should be coupled so that the inner member is the drive member for both transmission units and for a minimum overall ratio, the outer member should be the drive member for both transmission units. For an intermediate overall maximum ratio, either the inner or the outer member could be the drive member for both transmission units.

The invention can best be understood by reference to the following description taken in connection with the accompanying illustrative drawings.

BRIEF DESCRIPTION OF THE DRAWINGS

FIG. 1 is taken generally along line 1—1 of FIG. 2.

DESCRIPTION OF THE PREFERRED EMBODIMENTS

Figure 1:
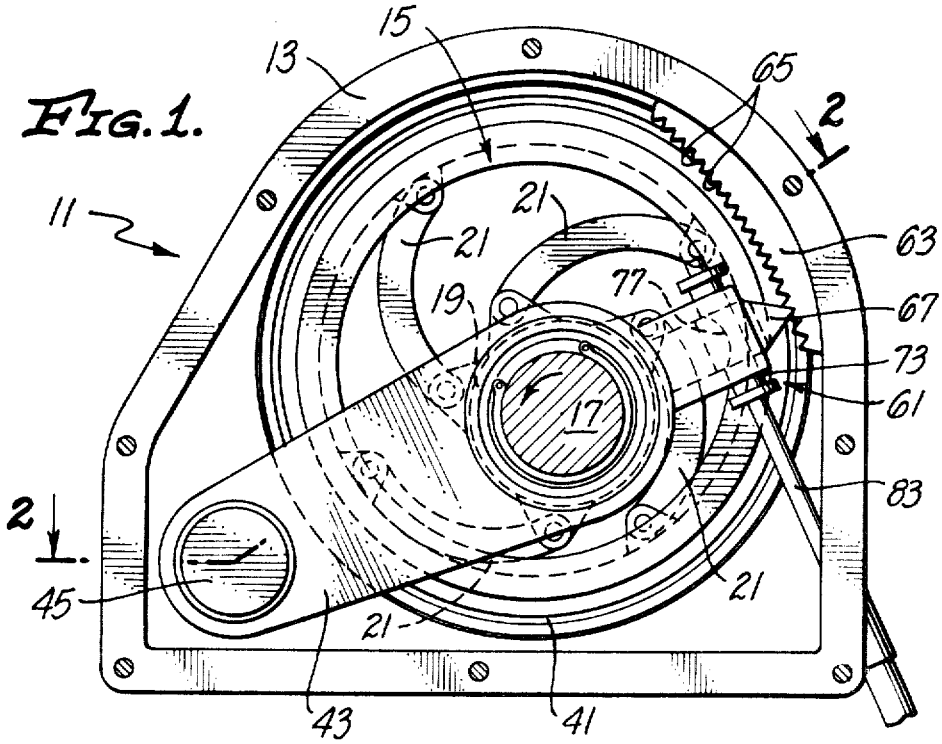
FIG. 1 is a side elevational view of a variable speed transmission constructed in accordance with the teachings of this invention with the outer cover removed.
Figure 1A:
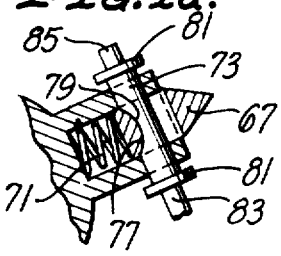
FIG. 1a is a fragmentary sectional view of one form of releasable detent means constructed in accordance with the teachings of this invention.
Figure 2:
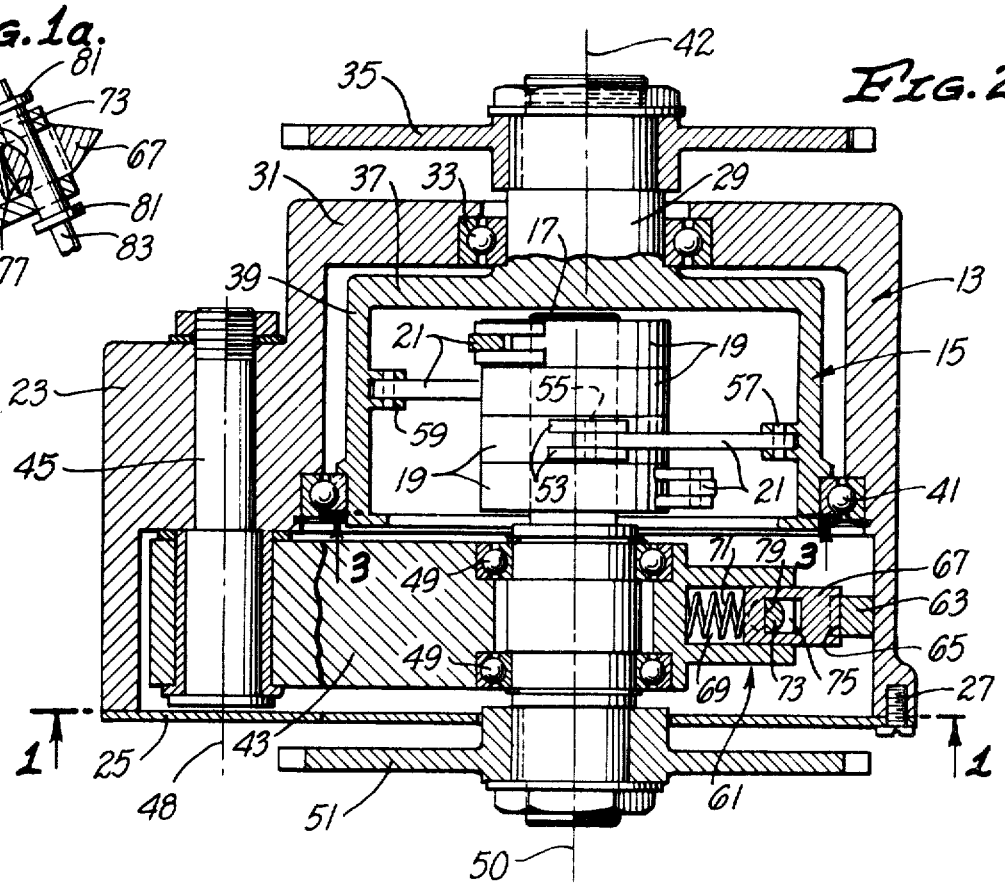
FIG. 2 is a sectional view taken generally along line 2—2 of FIG. 1.

FIGS. 1 and 2 show a variable speed transmission 11 which generally includes a housing 13 which forms a supporting structure of the transmission, an outer rotatable member 15, an inner rotatable member 17, a plurality of identical one-way clutches 19 mounted on, and concentric with, the inner rotatable member, and a plurality of drive elements 21 pivotally attached to the one-way clutches 19, respectively, and to the outer rotatable member 15. Although the housing 13 could take different forms, in the embodiment illustrated, it includes a housing section 23 which may be comprised of one or more individual sections and a cover plate 25 suitably removable attached to the housing section 23 as by a plurality of screws 27.

Although the outer rotatable member 15 may take different forms, in the embodiment illustrated, it includes a shaft 29 mounted on an end wall 31 of the housing by a bearing 33. The shaft 29 projects through the end wall 31 and is suitably affixed to a suitable power transmission element such as a sprocket 35. The outer rotatable member 15 also includes a radial wall 37 and a peripheral wall 39. The peripheral wall in the embodiment illustrated is cylindrical and coaxial with the shaft 29. The radial wall 37 and the peripheral wall 39 may be integral, and in the embodiment illustrated, the inner end of the peripheral wall is rotatably mounted within the housing 13 by a bearing 41. Thus, the bearings 33 and 41 cooperate to mount the outer rotatable member 15 for rotational movement about a rotational axis 42 which is coincident with the central axis of the member 15.

The rotatable member 15 is characterized herein as an outer rotatable member even though not all portions thereof lie radially outwardly of the inner rotatable member 17. The rotatable member 15 is an outer rotatable member in the sense that the location of the attachments of the drive elements 21 to the rotatable member 15 lie radially outwardly of the inner rotatable member 17. This attachment is accomplished in the embodiment shown in FIG. 2 by employing the peripheral wall 39; however, obviously other structural arrangements for attaching the drive elements 21 to the rotatable member 15 radially outwardly of the rotatable member 17 can be employed.

A mounting arm 43 is pivotally mounted on the housing 13 by a threaded fastener 45 and a sleeve bearing 47 (FIG. 2) mounted on the fastener. The mounting arm 43 pivots about a pivot axis 48 which is defined by the central axis of the screw 45 and which is parallel to the rotational axis 42.

The inner rotatable member 17 projects through, and is mounted on, the mounting arm 43 by a pair of bearings 49. The bearings 49 mount the inner rotatable member for rotation about a rotational axis 50 which is coincident with the central axis of the member 17 and which is parallel to the axis 42. The outer end of the inner rotatable member 17 extends through an opening in the cover plate 25 and is suitably affixed to a suitable motion transmitting element such as a sprocket 51.

The one-way clutches 19 are mounted on the inner rotatable member 17 and are stacked in an axially extending row. Each of the one-way clutches 19 is identical and is arranged to drive in one direction and free wheel in the other direction. The one-way clutches 19 are arranged on the inner rotatable member 17 so that all of them drive in the same direction. Each of the one-way clutches 19 may be of the Sprag or roller type, each of which has internal members which grip the inner rotatable member 17 in the driving direction to form a driving connection between the clutch and the inner rotatable member and which allow free wheeling in the other direction to permit relative angular motion between the inner rotatable member and the clutch in the opposite direction.

Figure 3:
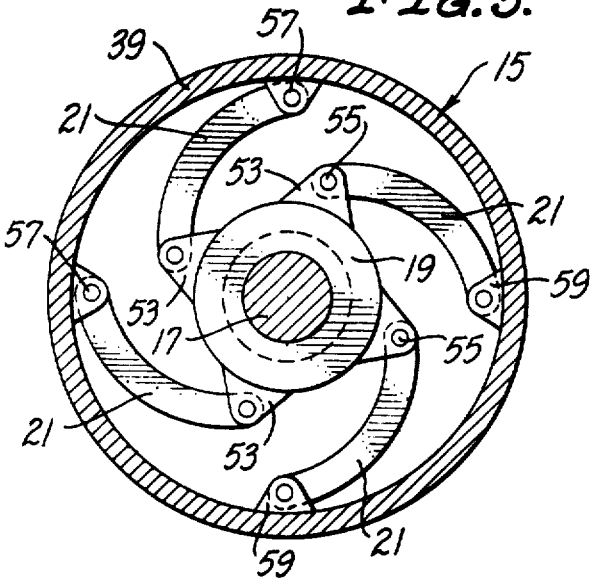
FIG. 3 is a simplified sectional view taken generally along line 3—3 of FIG. 2.

In the embodiment illustrated in FIGS. 1-3, each of the drive elements 21 is in the form of a rigid link pivotally coupled to flanges 53 on the one-way clutches 19 by pins 55. Although four of the drive elements 21 are illustrated, any number may be provided depending upon the output motion desired. The flanges 53 on the one-way clutches 19 are spaced circumferentially and, in the embodiment illustrated, are equally spaced circumferentially when the axes 42 and 50 coincide. Because four of the drive elements 21 are provided, the centers of the pivotal attachments between the drive element and the associated one-way clutch 19, i.e., the center line of the associated pin 55 are spaced apart 90°.

Similarly, the outer ends of the drive elements 21 are pivotally coupled to the peripheral wall 39 of the outer rotatable member 15 by pins 57 which extend through flanges 59 mounted on the peripheral wall. The location of the attachments of the drive elements 21 to the peripheral wall 39, i.e., the center lines of the pins 57 are spaced apart circumferentially equal distances which is 90° in the embodiment illustrated. In the embodiment illustrated, the axes of the pivotal attachments between the drive elements 21 and the clutches 19 and the peripheral wall 39 are parallel to the rotational axes 42 and 50.

The radial spacing between the rotational axes 42 and 50 can be varied by pivoting the mounting arm 43 about the pivot axis 48. This also moves the inner rotatable member 17 along an arcuate path to bring about the adjustment in the radial spacing between the rotational axes 42 and 50. Various means, such as releasable detent means 61, are provided for releasably fixing the mounting arm 43 and the inner rotatable member 17 in any one of a plurality of positions along such path.

Although the releasable detent means 61 may take different forms, in the embodiment illustrated, it includes a stop element 63 affixed to the housing section 21 and having a plurality of notches 65 therein opening toward the mounting arm 43. A detent 67 is mounted in a passage 69 in the outer end of the mounting arm 43 and is resiliently urged toward the notches 65 by a spring 71. The cooperation between the detent 67 and a selected one of the notches 65 retains the mounting arm 43, and hence the inner rotatable member 17, in the selected position relative to the rotational axis 42.

A cam 73 extends through an opening 75 in the detent 67 and through appropriate openings in the mounting arm 43 for the purpose of selectively removing the detent 67 from interlocking engagement with the notches 65. This allows the mounting arm 43 and the inner rotatable member 17 to be pivoted about the pivot axis 48 to adjust the radial spacing between the rotational axes 42 and 50.

The cam 73 has a cam surface 77 and the detent 67 has a cooperating cam follower surface 79 opening into the opening 75. Movement of the cam 73 is limited by flanges 81. The cam 73 can be moved in any suitable way such as rods or cables, and in the embodiment illustrated a rigid push-pull rod is used. The rod 83 extends from a location outside the housing 13 so that it can be appropriately manipulated, either manually or by a suitable mechanism (not shown).

By pulling the rod 83 downwardly as viewed in FIG. 1, the cam surface 77 cooperates with the cam follower surface 79 to urge the detent 67 inwardly of the mounting arm 43 against the biasing action of the spring 71. When the tip of the detent 67 clears the notch 65 in which it has been positioned, the mounting arm 43 pivots clockwise about the pivot axis 48 because of the torque applied thereto by the pull of the rod 83. When the desired angular position of the mounting arm 43 has been reached, the tension on the rod 83 is reduced to allow the spring 71 to urge the detent 67 into another one of the notches 65 to thereby fix the mounting arm 43 and the inner rotatable member 17 in a new position. By pushing the rod 83, the action described above can be repeated, except that the mounting arm 43 will be pivoted counterclockwise about the pivot axis 48, i.e., moved upwardly as viewed in FIG. 1. The force of the spring 71 and the resistance of the mounting arm 43 to rotation can be tailored so that withdrawal of the detent 67 from the notches 65 does not result in rapid pivoting of the mounting arm to an extreme position.

The transmission 11 can be used to transmit motion and power from the sprocket 35 to the sprocket 51 or from the sprocket 51 to the sprocket 35. In other words, the outer rotatable member 15 may serve as either the input member or the output member. Regardless of which of the members 15 and 17 is the input, the transmission 11 will operate to step up the motion, i.e., to provide a greater angular displacement at the output than at the input. The transmission 11 can be used to drive in either direction, i.e., clockwise or counterclockwise; however, it is necessary to arrange the one-way clutches 19 so that they will drive in the desired direction.

The ratio of angular displacement at the input to angular displacement at the output can be varied by adjusting the radial spacing between the rotational axes 42 and 50. When the rotational axes 42 and 50 are coincident, the drive ratio is one to one and as the rotational axis 50 is radially displaced from the rotational axis 42, the drive ratio increases.

The radial spacing between the rotational axes 42 and 50 can be established as discussed above utilizing the rod 83. If the drive ratio is to be other than one to one, the arm 43 may be pivoted so as to move the rotational axis 50 in either direction. Assuming that the inner rotational member 17 is the input member and is driven counterclockwise as indicated by the arrow in FIG. 1, then the inner rotatable member 17 applies a pulling force to the drive elements 21 to rotate the outer rotatable member 15 in the counterclockwise direction. Assuming that the rotational axes 42 and 50 are not coincident, then each of the drive elements 21 will tend to pull the outer rotational member 15 at a different angular velocity depending upon the relative positions of the drive elements about the rotational axis 50. The one-way clutch 19 for the drive element 21 which is in a driving mode will provide a driving connection between the inner rotatable member 17 and the associated drive element whereas the one-way clutches for the drive elements 21 which are moving faster are in a free wheeling mode so as not to impede the rotation of the outer rotatable member 15. When the outer rotatable member 15 is the drive member the direction of motion is reversed, and the one-way clutches 19 for the drive elements 21, which are moving slower than the driving element which is in the driving mode, are free wheeling.

Except for drive ratios of 1:1, the number of output pulses tending to drive the driven member is a function of the angular velocity of the outer rotatable member 15 and the number of drive elements 21. For example, with four drive elements 21 the outer rotatable member 15 as the driven member, and a drive ratio of 1:2, there will be 8 output pulses per revolution of the input member. Thus, by using the inner member 17 as the input, the number of output pulses increases with the drive ratio.

Figure 4:
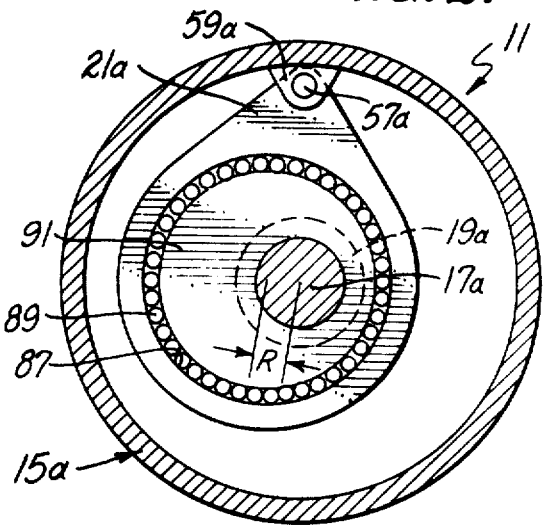
FIG. 4 is a simplified sectional view similar to FIG. 3 and showing a second form of drive element.

FIG. 4 shows a transmission 11a which is identical to the transmission 11 except for the manner in which the outer rotatable member 15a is drivingly coupled to the inner rotatable member 17a. Portions of the transmission 11a corresponding to portions of the transmission 11 are designated by corresponding reference numerals followed by the letter a.

The transmission 11a has drive elements 21a, and although for clarity only one drive element is shown in FIG. 4, it should be understood that a plurality may be provided as shown, for example, in FIGS. 1-3. The drive element 21a is coupled by a pin 57a and flanges 59a to the outer rotatable member 15a. The drive element 21a has an opening 87 which receives a bearing 89 and an eccentric 91 mounted on a one-way clutch 19a. The drive element 21a is a rigid link which circumscribes the eccentric 19 and the inner rotatable member 17a.

As discussed above, when the inner rotatable member 17a drives the outer rotatable member 15a, the approximate drive ratio is $1:1/1-X$ where $X=A/R$ and A is the amount of displacement of the axis of rotation of the inner rotatable member from the axis of rotation of the outer rotatable member and R is the distance between the axis of rotation of the inner member and the center of the location of attachment of the drive element to the inner member. To obtain a maximum drive ratio and the greatest ratio change for an increment of relative displacement between the rotational axes of the rotatable members, the R dimension should be minimized. One advantage of the embodiment of FIG. 4 is that the R dimension is very small, and accordingly these advantages are readily obtainable with the embodiment of FIG. 4. The transmission 11a operates in the same manner as described above with reference to the transmission 11.

Figure 5:
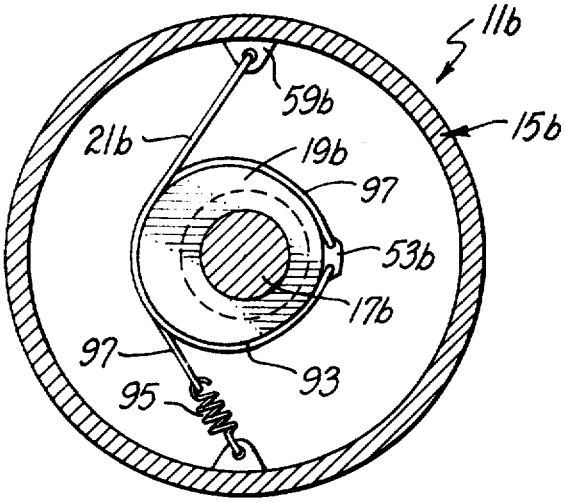
FIG. 5 is a simplified sectional view similar to FIG. 3 showing a third form of drive element.

FIG. 5 shows a transmission 11b which is identical to the transmission 11 in all respects except for the manner in which a driving connection is provided between the outer rotatable member 15b and the inner rotatable member 17b. Portions of the transmission 11b corresponding to portions of the transmission 11 are designated by corresponding reference numerals followed by the letter b.

The one-way clutch 19b has an outer peripheral surface 93. A flexible drive element 21b in the form of a cable is attached at one end to the flange 59b and at the other end to the flange 53b of the one-way clutch 19b. The flexible drive element 21b extends over and engages a portion of the peripheral surface 93. To maintain the drive element 21b taut, a coil spring 95 is attached at one end to the outer rotatable member 15b and at the other end to a cable 97 which in turn is attached to the one-way clutch 19b. As with the transmission 11, as many of the one-way clutches and drive elements as may be desired can be employed depending upon the desired linearity of the output.

The transmission 11b operates in the same manner as described above with reference to transmission 11. However, the cable is lighter and takes less room than the rigid link type of drive element. In addition, the peripheral surface 93 can be shaped to provide some additional control over the nature of the output motion. For example, in the embodiment illustrated, the peripheral surface 93 is noncylindrical and constitutes, in effect, a cam which tends to make the output motion more linear. The noncylindrical peripheral surface 93 may be integral with the one-way clutch 19b, or it may be provided by a suitably configured sleeve mounted on the one-way clutch.

Figure 6:
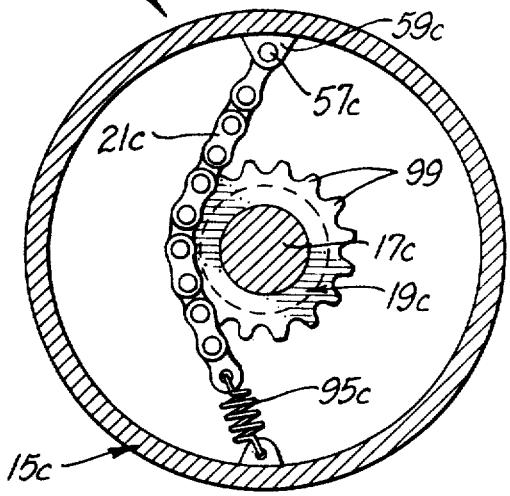
FIG. 6 is a simplified sectional view similar to FIG. 3 showing a fourth form of drive element.

FIG. 6 shows a transmission 11c which is identical to the trannsmission 11 except for the manner in which the outer rotatable member 15c is drivingly coupled to the inner rotatable member 17c. Portions of the transmission 11c corresponding to portions of the transmission 11 are designated by corresponding reference numerals followed by the letter c.

In the transmission 11c, the drive element 21c is in the form of a chain which is pivotally attached at one end to the outer rotatable member 15c by a pin 57c to a flange 59c and attached at its opposite end by a spring 95c to the outer rotatable member. In the embodiment illustrated, the pin 57c and the location of the attachment of the spring 95c to the outer rotatable member 15c are spaced apart 180°; however, obviously other spacings are permissible. The one-way clutch 19c has an outer peripheral surface which defines teeth 99 adapted to drivingly engage the chain and an intermediate portion of the chain is so engaged by the teeth. The teeth 99 may be arranged in a cylindrical or noncylindrical pattern, and in this latter event, a camming action which affects the linearity of the output motion is obtained. The spring 95c maintains the chain 21c taut.

The transmission 11c operates in the same manner described above with reference to the transmission 11. The advantages noted above for the transmission 11b are also applicable to the transmission 11c.

Figure 7:
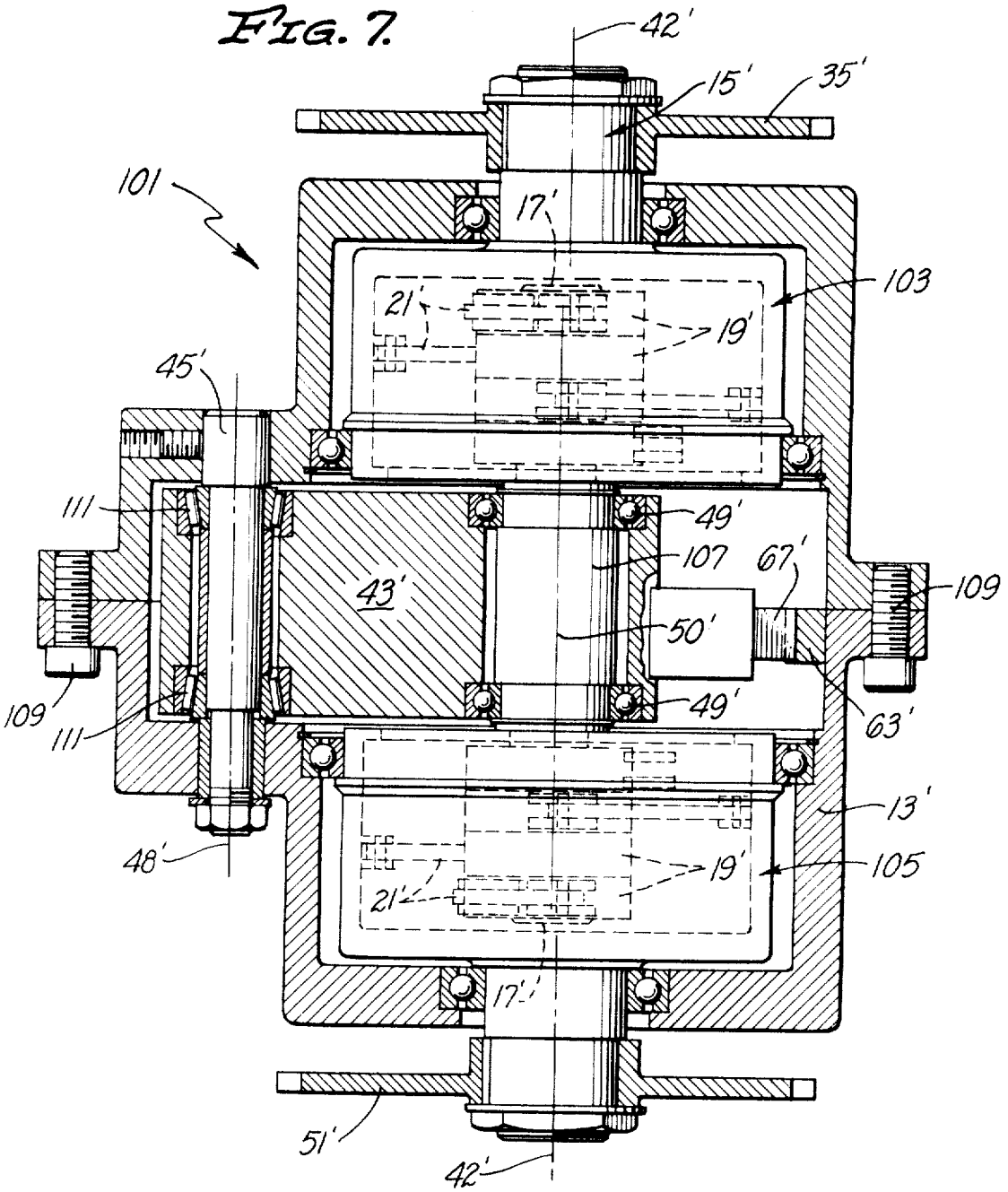
FIG. 7 is a sectional view of a variable speed transmission constructed in accordance with the teachings of this invention and incorporating therein two transmission units.

FIG. 7 shows a transmission 101 which comprises two transmission units 103 and 105 drivingly interconnected by a shaft 107. The transmission units 103 and 105, in the embodiment illustrated, are substantially identical and may conform to any of the transmissions 11, 11a, 11b, and 11c. In the embodiment illustrated, the transmission units 103 and 105 conform to the transmission 11 and portions thereof are designated by corresponding primed reference numerals. The housings 13 of the transmission units 103 and 105 are suitably interconnected as by screws 109 and the mounting arm 43' is mounted therebetween on roller bearings 111 and a fastener 45' for a pivotal movement about a pivotal axis 48'.

In the embodiment illustrated, both of the inner rotatable members 17 are coupled to, or integral with, the shaft 107. The shaft 107 is in turn rotatably mounted by bearings 49' on the mounting arm 43'. Accordingly, by pivoting the mounting arm 43', both of the inner rotatable members 17' are simultaneously displaced radially the same amount relative to their associated outer rotatable members 15'.

The transmission 101 may be operated in the same manner as the transmission 11. For example, assuming that the sprocket 35' is the drive member, then the outer rotatable member 15' of the transmission unit 103 drives the inner rotatable member 17' as previously described. This rotates the shaft 107 to drive the inner rotatable member 17' of the transmission unit 105. The inner rotatable member 17' of the drive unit 105 drives the associated outer rotatable member 15' and the sprocket 51'. Thus, the transmission unit 103 drives from the outer member to the inner member, and the transmission unit 105 drives from the inner member to the outer member. Both of the transmission units 103 and 105 operate to step up the motion and the overall drive ratio of the transmission 101 is greater than twice the drive ratio of the transmission unit 103 and less than twice the drive ratio of the transmission unit 105. The mounting arm 43' and the inner rotatable member 17' can be moved in the manner described above with reference to the transmission 11. The transmission units 103 and 105 may be coupled together in other ways so that, for example, the outer rotatable member of one would drive the inner rotatable member of the other, or the outer rotatable member of one would drive the outer rotatable member of the other.

Although exemplary embodiments of the invention have been shown and described, many changes, modifications and substitutions may be made by those having ordinary skill in the art without necessarily departing from the spirit and scope of this invention.

I claim:

1. A variable speed transmission comprising:

first and second rotatable members;

*first* mounting means for mounting said first [and second] rotatable [members] *member* for rotation about *a* first [and second] rotational [axes, respectively] *axis;*

*second mounting means for mounting said second rotatable member for rotation about a second rotational axis;* at least one drive element;

first means for drivingly coupling the drive element to the first rotatable member;

second means for drivingly coupling the drive element to the second rotatable member at a predetermined location;

said first means including one-way clutch means mounted on and substantially circumscribing the first rotatable member for providing a driving connection between said drive element and the first rotatable member in one direction about said first rotational axis and to allow the first rotatable member to rotate about said first rotational axis in the opposite direction whereby one of said rotatable members can drive the other of said rotatable members;

the rotation of said second rotatable member causing said predetermined location to circumscribe a region, said first rotational axis extending through said region; [and]

*at least one of* said mounting means including means for allowing adjustment in the relative radial position of said rotational axes whereby the drive ratio between said members can be varied*; and*

*said first mounting means supporting said first rotatable member on one side of said one-way clutch means and said first rotatable member being unsupported on the other side of said one-way clutch means and radially inwardly of said one-way clutch.*

2. A variable speed transmission as defined in claim 1 wherein said drive element includes a flexible drive element drivingly coupled to said rotatable members and resilient means for tensioning said flexible element.

3. A variable speed transmission as defined in claim 1 wherein said drive element includes a rigid link and said second means pivotally connects said link and said second rotatable member.

4. A variable speed transmission as defined in claim 3 wherein said first means includes an eccentric coupled to said one-way clutch means, said link at least substantially circumscribing said eccentric and bearing means between said eccentric and said link for providing a connection therewith which allows relative movement between said link and said eccentric.

5. A variable speed transmission as defined in claim 1 wherein the first rotatable member drives the second rotatable member through said drive element and said drive ratio can have a value such that the angular velocity of the second rotatable member exceeds the angular velocity of the first rotatable member, the number of pulses of the motion of the second rotatable member being a function of the angular velocity of the second rotatable member.

6. A variable speed transmission as defined in claim 1 wherein said adjustment means moves the first rotatable member and said one-way clutch means to adjust the relative radial position of said rotational axes.

7. A variable speed transmission comprising:

outer and inner rotatable members;

*first* mounting means for mounting said outer [and inner] rotatable [members] *member* for rotation about [said] *a* first [and second] rotational [axes, respectively] *axis;* at least first and second one-way clutches mounted on and substantially circumscribing said inner rotatable member, said first and second one-way clutches being arranged on said inner rotatable member in an axially extending row;

*second mounting means for supporting the inner rotatable member on one side of said row of one-way clutches for rotational movement about a second rotational axis whereby the inner rotatable member is unsupported on the other side of said row of one-way clutches and radially inwardly of said row of one-way clutches;* first and second drive elements attached to said first and second clutches, respectively, at circumferentially spaced locations and attached to said outer rotatable member at circumferentially spaced locations whereby rotation of one of said members about its rotational axis causes said drive elements to rotate the other of said rotatable members about its rotational axis; and

*at least one of* said mounting means including means for permitting adjustment of the radial spacing between said rotational axes.

8. A variable speed transmission as defined in claim 7 said outer member includes a peripheral wall substantially circumscribing said first and second one-way clutches.

9. A variable speed transmission as defined in claim 7 wherein said adjustment means includes means for mounting said inner rotatable member for pivotal movement about a third pivotal axis radially spaced from said first rotational axis whereby pivotal movement of said inner rotatable member about said third axis adjusts the radial spacing between said first and second rotational axes.

10. A variable speed transmission as defined in claim 7 wherein said adjustment means includes means for mounting said inner rotatable member for movement along a path in a direction to adjust the radial spacing between said first and second rotational axes and releasable detent means for releasably fixing said inner member in any one of a plurality of positions along said path.

11. A variable speed transmission as defined in claim 10 wherein the releasable detent means includes a detent movable with said inner member, a stop element having a plurality of notches therein, means for mounting said stop element in a fixed position, resilient means for urging said detent into any one of said notches to thereby releasably fix the relative positions of said first and second rotational axes, and means for selectively removing the detent from an associated one of the notches whereby the inner rotatable member can be moved along said path.

12. A variable speed transmission as defined in claim 7 wherein said outer and inner rotatable members are first outer and inner rotatable members, respectively, and including a second outer rotatable member and a second inner rotatable member, [second] *third* mounting means for mounting said second outer and second inner rotatable members for rotation about third and fourth rotational axes, respectively, at least third and fourth one-way clutches mounted on said second inner rotatable member;

third and fourth drive elements attached to said third and fourth clutches, respectively, at circumferentially spaced locations whereby the rotation of one of said second rotatable members about its rotational axis causes said third and fourth drive elements to rotate the other of said second rotatable members about its rotational axis, said [second] *third* mounting means including means for permitting adjustment of the radial spacing between said third and fourth rotational axes, and means for coupling one of said first rotatable members to one of said second rotatable members.

13. A variable speed transmission comprising:

a housing;

first and second variable speed transmission units in said housing;

each of said transmission units including outer and inner rotatable members, mounting means for mounting said outer and inner rotatable members for rotation about first and second rotational axes, respectively, at least one one-way clutch mounted on said inner rotatable member, a first drive element attached to said one-way clutch and to said outer rotatable member whereby the rotation of either of said rotatable members about its rotational axis causes the drive element to rotate the other of said rotatable members about its rotational axis, said mounting means including means for mounting one of said rotatable members for movement along a path to permit adjustment of the radial spacing between said rotational axes to thereby change the drive ratio; and means for drivingly coupling said one rotatable member of the first transmission unit to said one rotatable member of the second transmission unit whereby one of said transmission units can drive the other of said transmission units and the drive ratios of both of the transmission units can be simultaneously changed.

14. A variable speed transmission as defined in claim 13 wherein the members coupled by said coupling means are said inner rotatable members.

15. A variable speed transmission comprising first and second rotatable members;

mounting means for mounting said first and second rotatable members for rotation about first and second rotational axes, respectively;

at least one flexible drive element;

first means for drivingly coupling the flexible drive element to the first rotatable member;

second means for drivingly coupling the flexible drive element to the second rotatable member at a predetermined location;

at least one of said first and second means including a one-way clutch whereby one of said rotatable members can drive the other of said rotatable members through said flexible drive element;

the rotation of said second rotatable member causing said predetermined location to circumscribe a region, said first rotational axis extending through said region;

said mounting means including means for allowing adjustment in the radial spacing between said rotational axes whereby the drive ratio between said members can be varied; and resilient means for tensioning the flexible drive element.

16. A variable speed transmission as defined in claim 15 wherein said flexible drive element includes a chain drivingly coupled by said second means to said second rotatable member and said first means includes sprocket teeth cooperable with said chain to form a driving connection therewith.

17. A variable speed transmission as defined in claim 15 including means on said first rotatable member defining a noncylindrical peripheral surface, said flexible drive element extending along and engaging at least a portion of said noncylindrical surface.

*18. A variable speed transmission as defined in claim 7 wherein said outer rotatable member has a peripheral wall substantially circumscribing said first and second one-way clutches and an end wall on said other side of said row of one-way clutches and said inner rotatable member terminates short of said end wall.*

*19. A variable speed transmission as defined in claim 7 wherein said adjustment means includes a mounting arm and means for mounting the mounting arm for pivotal movement about a third axis which is radially spaced from said second rotational axis and said second mounting means mounts said inner rotatable member on said mounting arm whereby pivotal movement of the mounting arm about said third axis adjusts the radial spacing between the first and second rotational axes.*

*20. A variable speed transmission as defined in claim 19 wherein said outer rotatable member has a peripheral wall substantially circumscribing said first and second one-way clutches and an end wall on said other side of said row of one-way clutches and said inner rotatable member terminates short of said end wall.*

*21. A variable speed transmission comprising:*

*outer and inner rotatable members;*

*first mounting means for mounting said outer rotatable member for rotation about a first rotational axis;*

*second mounting means for mounting said inner rotatable member for rotation about a second rotational axis;*

*at least first and second one-way clutches mounted on and substantially circumscribing said inner rotatable member, said first and second one-way clutches being arranged on said inner rotatable member in an axially extending row;*

*first and second drive elements attached to said first and second clutches, respectively, at circumferentially spaced locations and attached to said outer rotatable member at circumferentially spaced locations whereby rotation of one of said members about its rotational axis causes said drive elements to rotate the other of said rotatable members about its rotational axis;*

*at least one of said mounting means including means for permitting adjustment of the radial spacing between said rotational axes; and*

*said outer rotatable member having an end wall on one side of said row of one-way clutches, said inner rotatable member and said second mounting means terminating short of said end wall.*

*22. A variable speed transmission comprising:*

*first and second rotatable members;*

*first mounting means for mounting said first rotatable member for rotation about a first rotational axis;*

*second mounting means for mounting said second rotatable member for rotation about a second rotational axis;*

*at least one drive element;*

*first means for drivingly coupling the drive element to the first rotatable member;*

*second means for drivingly coupling the drive element to the second rotatable member at a predetermined location;*

*said first means including one-way clutch means mounted on and substantially circumscribing the first rotatable member for providing a driving connection between said drive element and the first rotatable member in one direction about said first rotational axis and to allow the first rotatable member to rotate about said first rotational axis in the opposite direction whereby one of said rotatable members can drive the other of said rotatable members;*

*the rotation of said second rotatable member causing said predetermined location to circumscribe a region, said first rotational axis extending through said region;*

*at least one of said mounting means including means for allowing adjustment in the relative radial position of said rotational axes whereby the drive ratio between said members can be varied; and*

*said second rotatable member having an end wall and at least partially receiving said first rotatable member, said first rotatable member and said first mounting means terminating short of said end wall.*

*23. A variable speed transmission comprising:*

*outer and inner rotatable members;*

*mounting means for mounting said outer and inner rotatable members for rotation about said first and second rotational axes, respectively;*

*at least first and second one-way clutches mounted on and substantially circumscribing said inner rotatable member, said first and second one-way clutches being arranged on said inner rotatable member in an axially extending row;*

*first and second drive elements attached to said first and second clutches, respectively, at circumferentially spaced locations and attached to said outer rotatable member at circumferentially spaced locations whereby rotation of one of said members about its rotational axis causes said drive elements to rotate the other of said rotatable members about its rotational axis;*

*said mounting means including means for permitting adjustment of the radial spacing between said rotational axes; and*

*said adjustment means including means for mounting said inner rotatable member for pivotal movement about a third pivotal axis radially spaced from said first rotational axis whereby pivotal movement of said inner rotatable member about said third axis adjusts the radial spacing between said first and second rotational axes.*

*24. A variable speed transmission comprising:*

*outer and inner rotatable members;*

*first mounting means for mounting said outer rotatable member for rotation about a first rotational axis;*

*second mounting means for mounting said inner rotatable member in cantilever fashion for rotation about a second rotational axis whereby a length of said inner rotatable member from said second mounting means through a first end of said inner rotatable member is unsupported;*

*at least first and second one-way clutches mounted on and substantially circumscribing said length of said inner rotatable member, said first and second one-way clutches being arranged on said length of said inner rotatable member in an axially extending row;*

*first and second drive elements attached to said first and second clutches, respectively, at circumferentially spaced locations and attached to said outer rotatable member at circumferentially spaced locations whereby rotation of one of said members about its rotational axis causes said drive elements to rotate the other of said rotatable members about its rotational axis; and*

*at least one of said mounting means including means for permitting adjustment of the radial spacing between said rotational axes.*

* * * * *